K. MOORING.
PIPE JOINT.
APPLICATION FILED AUG. 3, 1914.
1,151,703.
Patented Aug. 31, 1915.
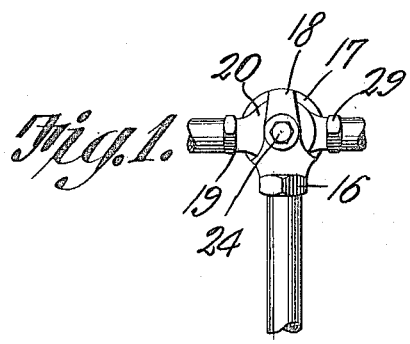
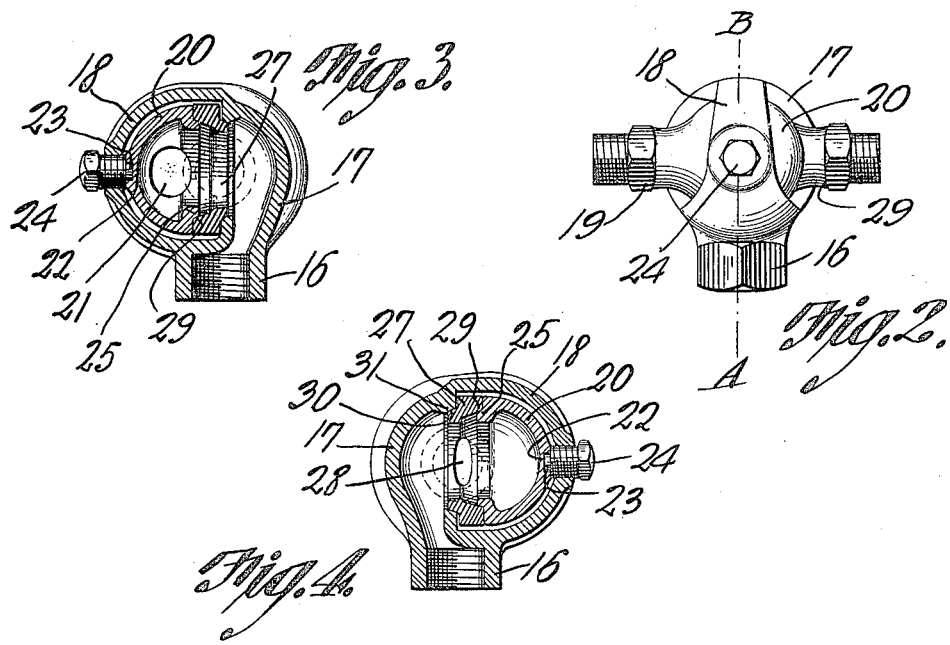
K. Mooring, Inventor

UNITED STATES PATENT OFFICE.

KENNETH MOORING, OF HUNTINGTON, WEST VIRGINIA.

PIPE-JOINT.

1,151,703.

Specification of Letters Patent. Patented Aug. 31, 1915.

Application filed August 3, 1914. Serial No. 854,736.

*To all whom it may concern:*

Be it known that I, KENNETH MOORING, a citizen of the United States, residing at Huntington, in the county of Cabell and State of West Virginia, have invented a new and useful Pipe-Joint, of which the following is a specification.

The device forming the subject matter of this application is a three-way pipe joint, adapted to be employed in uniting a plurality of pipes, so that the pipes may be disposed at an angle with respect to each other, the use of washers or packing gaskets being unnecessary.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows the invention in elevation; Fig. 2 is an elevation of the coupling detached; Figs. 3 and 4 are sections on the line A—B of Fig. 2, looking in opposite directions in the respective views.

In carrying out the present invention there is provided a main member 16 of tubular form, connected with a cup 17. A transverse arm 18 extends between the tubular member 16 and the rim of the cup 17, as clearly shown in Fig. 3. An auxiliary tubular member 19 is provided, the same being connected with a cup 20. As shown at 21, the bore of the auxiliary member 19 opens into the cup 20. In its outer face, the cup 20 is provided with a seat 22 adapted to receive the tip 23 of a screw 24 threaded into the arm 18. The cup 20 is provided with a beveled flange 25 coöperating with the beveled inner face 29 of a ring 27 communicating as indicated at 28 with a supplemental tubular member 29, a portion of the outer face of the ring 27 being beveled as shown at 30 to coöperate with a beveled, inwardly extended rib 31 on the cup 17.

As will be understood readily, when the screw 24 is loosened, the supplemental tubular member 29, the auxiliary member 19 and the main tubular member 16 may be disposed at different angles with respect to each other, and, by rotating the screw 24 to a seat, the beveled portions of the cup 17, the ring 27 and the cup 20 may be brought into close and intimate relation, thereby effecting a water tight joint. The screw serves the double function of a clamp and a pivot element, and it is to be observed that gaskets or other packing elements may be dispensed with, owing to the beveled or cone-shaped relation existing between those portions of the coupling which come into intimate contact to effect a water tight joint.

Having thus described the invention, what is claimed is:—

A pipe coupling comprising a main member including a cup having a rim, a tubular neck opening into the cup, and an arm connected integrally at its ends with the cup and extended transversely of the cup; a ring provided with a conical flange extended within the rim of the cup, the ring being provided with a tubular neck opening through the ring; a second cup provided with a conical flange extended within the ring and provided with a tubular neck opening into the said cup; and a screw threaded into the arm and engaging the outer face of the second cup, thereby to leave the ring and the cups axially unencumbered; the integral connection between the arm and the cup serving to strengthen the arm to withstand the added screw-pressure made necessary by the presence of the ring, and the relative relations between the flange of the second cup and the ring upon the one hand, and the flange of the ring and the first specified cup upon the other hand serving to reinforce the ring against circumferential strain when the screw is advanced into a clamping position.

In testimony that I claim the foregoing as my own, I have hereto affixed my signature in the presence of two witnesses.

KENNETH MOORING.

Witnesses:
WALTER H. FARRELL,
SELMA PRICE.

Copies of this patent may be obtained for five cents each, by addressing the "Commissioner of Patents, Washington, D. C."